(12) United States Patent (10) Patent No.: US 11,203,392 B2
Yamasaki et al. (45) Date of Patent: Dec. 21, 2021

(54) SADDLE RIDING VEHICLE

(71) Applicant: HONDA MOTOR CO., LTD., Tokyo (JP)

(72) Inventors: Shota Yamasaki, Wako (JP); Takayoshi Tsujinaka, Wako (JP); Takahiro Matsumoto, Wako (JP); Akira Mogi, Wako (JP); Keita Mikura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 16/597,051

(22) Filed: Oct. 9, 2019

(65) Prior Publication Data

US 2020/0164944 A1 May 28, 2020

(30) Foreign Application Priority Data

Nov. 22, 2018 (JP) .............................. JP2018-219692

(51) Int. Cl.
| | |
|---|---|
| *B62K 11/04* | (2006.01) |
| *B62K 25/28* | (2006.01) |
| *B62J 45/00* | (2020.01) |
| *B62H 1/00* | (2006.01) |
| *B62J 37/00* | (2006.01) |
| *B62L 1/00* | (2006.01) |

(52) U.S. Cl.
CPC ............... *B62K 11/04* (2013.01); *B62J 45/00* (2020.02); *B62K 25/283* (2013.01); *B62H 1/00* (2013.01); *B62J 37/00* (2013.01); *B62L 1/00* (2013.01)

(58) Field of Classification Search
None
See application file for complete search history.

(56) References Cited

U.S. PATENT DOCUMENTS 10,328,986 B2 * 6/2019 Koo .......................... B62J 50/10

FOREIGN PATENT DOCUMENTS

| | | |
|---|---|---|
| CN | 101980908 A | 2/2011 |
| CN | 103010355 A | 4/2013 |
| EP | 2263925 B1 | 9/2016 |
| EP | 3219596 A1 | 9/2017 |
| JP | 2009214679 A * | 9/2009 |
| JP | 2015-155245 A | 8/2015 |
| JP | 2015168358 A * | 9/2015 |
| JP | 5848213 | 1/2016 |
| JP | 2017-165229 | 9/2017 |
| JP | 6238926 B2 | 11/2017 |
| WO | 2013/001712 | 2/2015 |

OTHER PUBLICATIONS

Indian Office Action dated Mar. 17, 2021, 7 pages.
(Continued)

*Primary Examiner* — Kevin Hurley
(74) *Attorney, Agent, or Firm* — Rankin, Hill & Clark LLP

(57) ABSTRACT

In a saddle riding vehicle including a vehicle body frame, a swing arm that supports a rear wheel, a pivot shaft that swingably supports the swing arm on the vehicle body frame, and a regulator for an electric system, the regulator is supported by a stay and the regulator is disposed, in a vehicle side view, posterior to the pivot shaft and inferior to an upper surface of the swing arm.

13 Claims, 11 Drawing Sheets

(56) References Cited

OTHER PUBLICATIONS

IN1051CHE2015A, listed in Indian Office Action, 48 pages.
Japanese Office Action with English Translation dated Jun. 30, 2020, 13 pages.
Chinese Office Action dated Feb. 2, 2021, 8 pages.
German Office Action with English Translation dated Jul. 29, 2020, 24 pages.

* cited by examiner

SADDLE RIDING VEHICLE

INCORPORATION BY REFERENCE

The present application claims priority under 35 U.S.C. § 119 to Japanese Patent Application No. 2018-219692 filed on Nov. 22, 2018. The content of the application is incorporated herein by reference in its entirety.

TECHNICAL FIELD

The present invention relates to a saddle riding vehicle.

BACKGROUND ART

A hitherto known saddle riding vehicle includes an electric system regulator and a hydraulic control unit of a braking device disposed near a down frame (see, for example, Patent Document 1).

PRIOR ART DOCUMENT

Patent Document

[Patent Document 1]
Japanese Patent Laid-open No. 2017-165229

SUMMARY OF THE INVENTION

Problem to be Solved by the Invention

The saddle riding vehicle has only a limited space for mounting components compared with an automobile and a need thus exists for capability of efficient disposition of the electric system regulator.

The present invention has been made in view of the foregoing situation and it is an object of the present invention to enable an electric system regulator to be efficiently disposed in a saddle riding vehicle.

Means for Solving the Problem

In one aspect of the present invention, a saddle riding vehicle includes a vehicle body frame (10), a swing arm (13) that supports a rear wheel (3), a pivot shaft (21) that swingably supports the swing arm (13) on the vehicle body frame (10), and a regulator (57) for an electric system. In this saddle riding vehicle, the regulator (57) is supported by a stay (55), and the regulator (57) is disposed, in a vehicle side view, posterior to the pivot shaft (21) and inferior to an upper end (13a) of the swing arm (13).

In the foregoing configuration, preferably, a hydraulic control unit (56) of a braking device for a wheel (2, 3) is mounted on the stay (55), and the hydraulic control unit (56) is disposed posterior to the pivot shaft (21) and inferior to the upper end (13a) of the swing arm (13).

In the foregoing configuration, preferably, a canister (58) that adsorbs fuel vapors is mounted on the stay (55), and the canister (58) is disposed posterior to the pivot shaft (21) and inferior to the upper end (13a) of the swing arm (13).

In the foregoing configuration, preferably, the vehicle body frame (10) includes a pivot frame (18L, 18R) that supports the pivot shaft (21), the stay (55) is mounted on the vehicle body frame (10) at a position inferior to the upper end (13a) of the swing arm (13) and extends further posteriorly relative to the pivot frame (18L, 18R), the regulator (57) is disposed at a lower portion of the stay (55), the hydraulic control unit (56) is disposed at an upper portion of the stay (55), and the canister (58) is disposed at a rear portion of the stay (55).

In the foregoing configuration, preferably, the vehicle body frame (10) includes a cross frame (23) that connects a pair of the left and right pivot frames (18L, 18R) in a left-right direction, and the stay (55) has a front portion mounted on the cross frame (23).

In the foregoing configuration, preferably, the stay (55) has a lower surface (93c) inclined upwardly toward a rear, and the regulator (57) is disposed to extend along the lower surface (93c).

In the foregoing configuration, preferably, the canister (58) is provided with a canister cover (61) that covers the canister (58), and the regulator (57) is located anterior to the canister cover (61).

In the foregoing configuration, preferably, the hydraulic control unit (56) is provided with a cover (60) that covers the hydraulic control unit (56), the cover (60) includes an extended portion (60h) that extends posteriorly from a rear portion of the cover (60), and the canister cover (61) has a front edge portion (61e) overlapping the extended portion (60h) in a vertical direction.

In the foregoing configuration, preferably, the saddle riding vehicle includes a side stand (40) that supports the saddle riding vehicle when the saddle riding vehicle is parked, and the side stand (40), when stowed, overlaps the regulator (57) from an outside in a vehicle side view.

In the foregoing configuration, preferably, the saddle riding vehicle includes an internal combustion engine (11) that drives the rear wheel (3), and an exhaust device (28) of the internal combustion engine (11) overlaps the regulator (57) from the outside in a vehicle side view.

In the foregoing configuration, preferably, the stay (55) includes a first stay (71) that is fixed to the vehicle body frame (10) and a second stay (72) that is rubber-mounted on the first stay (71), and the regulator (57) and the canister (58) are fixed to the second stay (72).

In the foregoing configuration, preferably, the regulator (57) is disposed inferior to a lower end (13b) of the swing arm (13) in a vehicle side view.

In the foregoing configuration, preferably, the saddle riding vehicle includes a side stand (40) that supports the saddle riding vehicle when the saddle riding vehicle is parked and an internal combustion engine (11) that drives the rear wheel (3), and, under a condition in which the side stand (40) is stowed, the regulator (57) is covered by the side stand (40) and an exhaust device (28) of the internal combustion engine (11) from both lateral sides.

In the foregoing configuration, preferably, the stay (55) includes, at a front portion of the stay (55), a protective wall portion (96) that extends inferiorly, a canister cover (61) is provided for covering the canister (58), and the regulator (57) is covered by the protective wall portion (96) from a front and by the canister cover (61) from a rear.

Effects of the Invention

The saddle riding vehicle includes the vehicle body frame, the swing arm that supports the rear wheel, the pivot shaft that swingably supports the swing arm on the vehicle body frame, and the regulator for an electric system. The regulator is supported by the stay. The regulator is disposed, in a vehicle side view, posterior to the pivot shaft and inferior to the upper end of the swing arm.

Through the foregoing configuration, the regulator for the electric system can be efficiently disposed, in the saddle riding vehicle having a limited space for mounting components, using a space posterior to the pivot shaft and inferior to the upper surface of the swing arm.

In the foregoing configuration, the hydraulic control unit of braking devices for wheels may be mounted on the stay, and the hydraulic control unit may be disposed posterior to the pivot shaft and inferior to the upper end of the swing arm.

Through the foregoing configuration, the hydraulic control unit can be efficiently disposed via the stay using a space posterior to the pivot shaft and inferior to the upper surface of the swing arm.

In the foregoing configuration, the canister that adsorbs fuel vapors may be mounted on the stay, and the canister may be disposed posterior to the pivot shaft and inferior to the upper end of the swing arm.

Through the foregoing configuration, the canister can be efficiently disposed via the stay using a space posterior to the pivot shaft and inferior to the upper surface of the swing arm.

In the foregoing configuration, the vehicle body frame may include the pivot frames that support the pivot shaft, the stay may be disposed on the vehicle body frame at a position inferior to the upper end of the swing arm and may extend further posteriorly relative to the pivot frames, the regulator may be disposed at the lower portion of the stay, the hydraulic control unit may be disposed at the upper portion of the stay, and the canister may be disposed at the rear portion of the stay.

Through the foregoing configuration, the regulator, the hydraulic control unit, and the canister can be supported by a simple structure at a position inferior to the upper surface of the swing arm using the stay that is disposed inferior to the upper surface of the swing arm and extends further posteriorly relative to the pivot frames. The regulator, the hydraulic control unit, and the canister can be disposed in a well-balanced manner at the lower portion of the stay, at the upper portion of the stay, and at the rear portion of the stay, respectively.

In the foregoing configuration, the vehicle body frame may include the cross frame that connects a pair of the left and right pivot frames in the left-right direction, and the stay may have the front portion mounted on the cross frame.

Through the foregoing configuration, the stay can be rigidly supported by a simple structure using the cross frame that connects the pivot frames in the left-right direction.

In the foregoing configuration, the stay may have the lower surface inclined upwardly toward the rear, and the regulator may be disposed to extend along the lower surface.

Through the foregoing configuration, the regulator is inclined along the lower surface of the stay that is inclined upwardly toward the rear, so that an effect from, for example, splashing mud from below on the regulator can be reduced.

In the foregoing configuration, the canister may be provided with the canister cover that covers the canister, and the regulator may be located anterior to the canister cover.

Through the foregoing configuration, the regulator can be protected from the rear using the canister cover.

In the foregoing configuration, the hydraulic control unit may be provided with the cover that covers the hydraulic control unit, the cover may include the extended portion that extends posteriorly from the rear portion of the cover, and the canister cover may have the front edge portion overlapping the extended portion in the vertical direction.

Through the foregoing configuration, a labyrinth structure can be formed by portions of the front edge portion of the canister cover and the extended portion of the cover overlapping in the vertical direction, so that rainwater or the like can be prevented from entering the space between the cover and the canister cover.

In the foregoing configuration, the saddle riding vehicle may include the side stand that supports the saddle riding vehicle when the saddle riding vehicle is parked, and the side stand, when stowed, may overlap the regulator from the outside in a vehicle side view.

Through the foregoing configuration, the regulator can be protected from the outer lateral side using the side stand.

In the foregoing configuration, the saddle riding vehicle may include the internal combustion engine that drives the rear wheel, and the exhaust device of the internal combustion engine may overlap the regulator from the outside in a vehicle side view.

Through the foregoing configuration, the exhaust device can be used for protecting the regulator from the outer lateral side.

In the foregoing configuration, the stay may include the first stay that is fixed to the vehicle body frame and the second stay that is rubber-mounted on the first stay, and the regulator and the canister may be fixed to the second stay.

Through the foregoing configuration, the regulator and the canister can be rubber-mounted through a simple structure. This permits the use of a regulator of an ordinary type having no special vibration-proof structure, so that the cost of the regulator can be reduced.

In the foregoing configuration, the regulator may be disposed inferior to the lower end of the swing arm in a vehicle side view.

Through the foregoing configuration, the regulator can be efficiently disposed using a space inferior to the lower end of the swing arm.

In the foregoing configuration, the saddle riding vehicle may include the side stand that supports the saddle riding vehicle when the saddle riding vehicle is parked and the internal combustion engine that drives the rear wheel, and, under a condition in which the side stand is stowed, the regulator may be covered by the side stand and the exhaust device of the internal combustion engine from both lateral sides.

Through the foregoing configuration, the regulator can be protected by the side stand and the exhaust device from the lateral sides.

In the foregoing configuration, the stay may include, at the front portion thereof, the protective wall portion that extends inferiorly, the canister cover may be provided for covering the canister, and the regulator may be covered by the protective wall portion from the front and by the canister cover from the rear.

Through the foregoing configuration, the regulator can be protected in the fore-aft direction by the protective wall portion of the stay and the canister cover.

MODE FOR CARRYING OUT THE INVENTION

Figure 1:
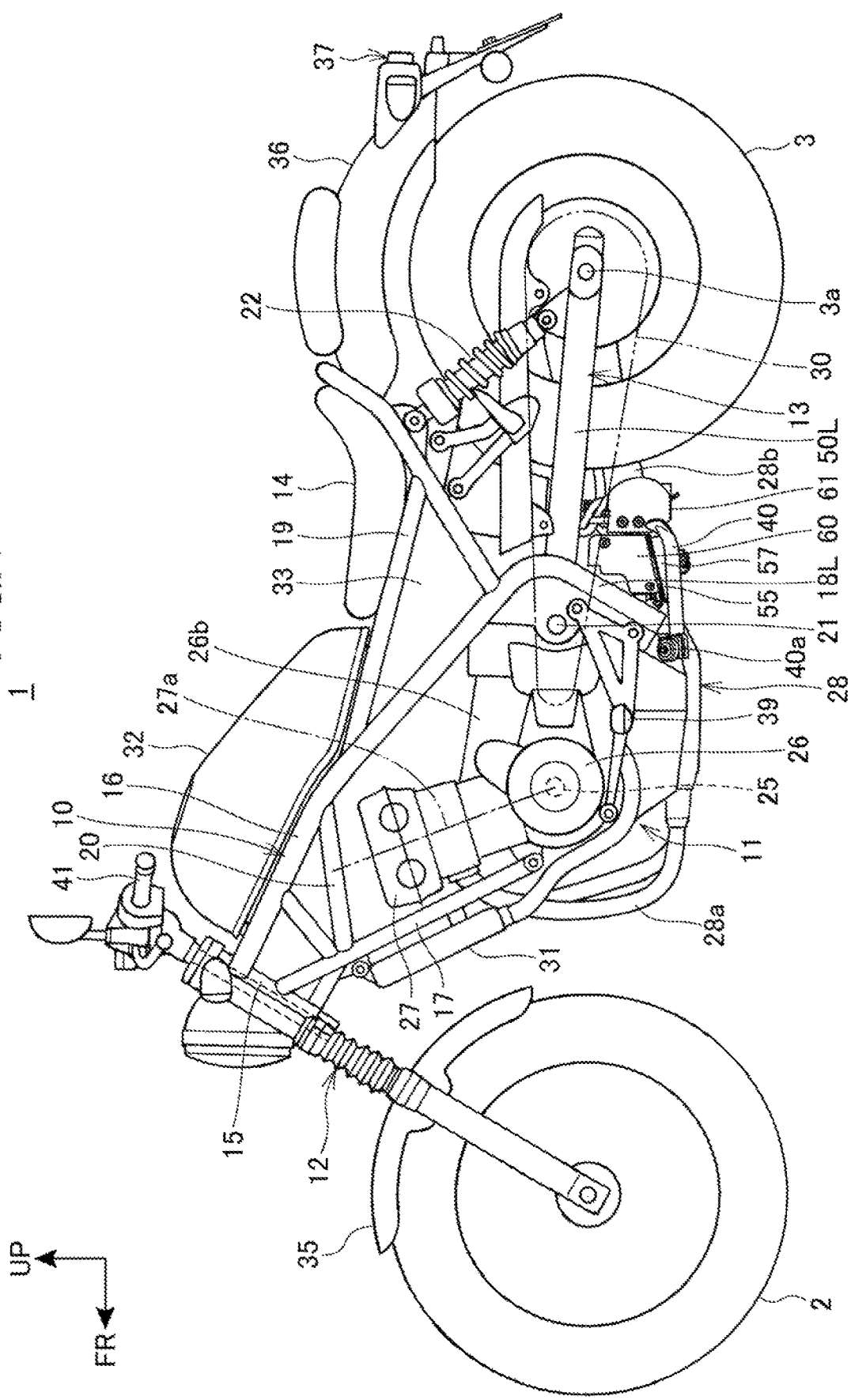
FIG. 1 is a left side elevation view of a motorcycle according to an embodiment of the present invention.

A specific embodiment to which the present invention is applied will be described below with reference to the accompanying drawings. Throughout the descriptions given hereunder, expressions indicating directions including front and rear, right and left, and upper and lower are identical to directions relative to the vehicle body unless otherwise specified. In the drawings, a reference symbol FR indicates an anterior direction of the vehicle body, a reference symbol UP indicates a superior direction of the vehicle body, and a reference symbol LH indicates a leftward direction of the vehicle body.

FIG. 1 is a left side elevation view of a motorcycle 1 according to an embodiment of the present invention.

The motorcycle 1 includes an engine 11, a front fork 12, and a swing arm 13. The engine 11 as a power unit is supported on a vehicle body frame 10. The front fork 12 steerably supports a front wheel 2 (wheel). The front fork 12 is steerably supported at a front end of the vehicle body frame 10. The swing arm 13 supports a rear wheel 3. The swing arm 13 is disposed on a rear portion side of the vehicle body frame 10.

The motorcycle 1 is a saddle riding vehicle in which an occupant straddles a seat 14. The seat 14 is disposed at a position superior to a rear portion of the vehicle body frame 10.

The vehicle body frame 10 includes a head pipe 15, a pair of left and right main frames 16, a down frame 17, a pair of left and right pivot frames 18L and 18R, and a seat frame 19. The head pipe 15 is disposed at a front end of the vehicle body frame 10. The main frames 16 extend from the head pipe 15 downwardly toward the rear. The down frame 17 extends from a position in the head pipe 15 inferior to the main frames 16 downwardly toward the rear. The pivot frames 18L and 18R extend from rear ends of the main frames 16 downwardly. The seat frame 19 extends from rear portions of the main frames 16 and upper portions of the pivot frames 18L and 18R toward the rear.

The vehicle body frame 10 further includes a plurality of reinforcement frames 20. The reinforcement frames 20 connect upper portions of the down frame 17 with upper portions of the main frames 16.

The swing arm 13 is journaled by a pivot shaft 21. The pivot shaft 21 is supported by the left and right pivot frames 18L and 18R. The pivot shaft 21 extends horizontally in a vehicle width direction. The pivot shaft 21 is supported by front portions of the left and right pivot frames 18L and 18R. The swing arm 13 has a front end portion journaled by the pivot shaft 21. The swing arm 13 is thereby swung vertically about the pivot shaft 21.

The rear wheel 3 is journaled by an axle 3a. The axle 3a is disposed at a rear end portion of the swing arm 13.

The motorcycle 1 includes a pair of left and right rear suspensions 22. The rear suspensions 22 are each disposed across a rear end portion of the swing arm 13 and the seat frame 19.

The engine 11 is disposed at a position inferior to the main frames 16 and between the down frame 17 and the pivot frames 18L and 18R in a vehicle fore-aft direction and is fixed to the vehicle body frame 10.

The engine 11 includes a crankcase 26 and a cylinder portion 27. The crankcase 26 supports a crankshaft 25. The crankshaft 25 extends horizontally in the vehicle width direction (left-right direction). The cylinder portion 27 extends superiorly from a front portion of the crankcase 26. The cylinder portion 27 has a cylinder axis 27a. The cylinder axis 27a is inclined anteriorly with respect to the vertical.

An intake device (not illustrated) of the engine 11 is connected with an intake port in a rear surface of the cylinder portion 27.

An exhaust device 28 of the engine 11 includes an exhaust pipe 28a and a muffler 28b. The exhaust pipe 28a is connected with an exhaust port in a front surface of the cylinder portion 27. The muffler 28b is connected with a downstream end of the exhaust pipe 28a.

The exhaust pipe 28a extends inferiorly from the exhaust port and further extends, by way of a path inferior to the engine 11, toward the rear. The muffler 28b is disposed laterally outside the swing arm 13 and the rear wheel 3.

The crankcase 26 has a rear portion constituting a transmission case portion 26b. The transmission case portion 26b houses a transmission. An output from the engine 11 is transmitted to the rear wheel 3 by a drive chain 30. The drive chain 30 connects an output shaft of the transmission with the rear wheel 3.

A radiator 31 of the engine 11 is supported by the down frame 17.

A fuel tank 32 is disposed superior to the main frames 16 and between the head pipe 15 and the seat 14.

A side cover 33 covers a portion across the seat frame 19 and the main frames 16.

A front fender 35, which covers the front wheel 2 from above, is supported by the front fork 12.

The rear wheel 3 is covered by a rear fender 36 from above. The rear fender 36 is disposed posterior to the seat 14.

A rear-portion lighting device unit 37 is mounted on a rear end portion of the rear fender 36.

A pair of left and right steps 39 is disposed anterior to the left and right pivot frames 18L and 18R. An occupant sitting in the seat 14 rests his or her feet on the steps 39.

A side stand 40 is supported at a lower end portion of the pivot frame 18L on the left-hand side. The side stand 40 is grounded to thereby support the vehicle body when the motorcycle 1 is parked. The side stand 40 is provided rotatably about a support shaft 40a, which is disposed at an upper end. Under a condition in which the motorcycle 1 is parked, the side stand 40 extends from the support shaft 40a inferiorly to thereby contact the ground. The side stand 40 is rotated superiorly to the rear about the support shaft 40a to thereby be stowed on the vehicle body side as illustrated in FIG. 1.

A steering handlebar 41 is provided at an upper end of the front fork 12.

Figure 2:
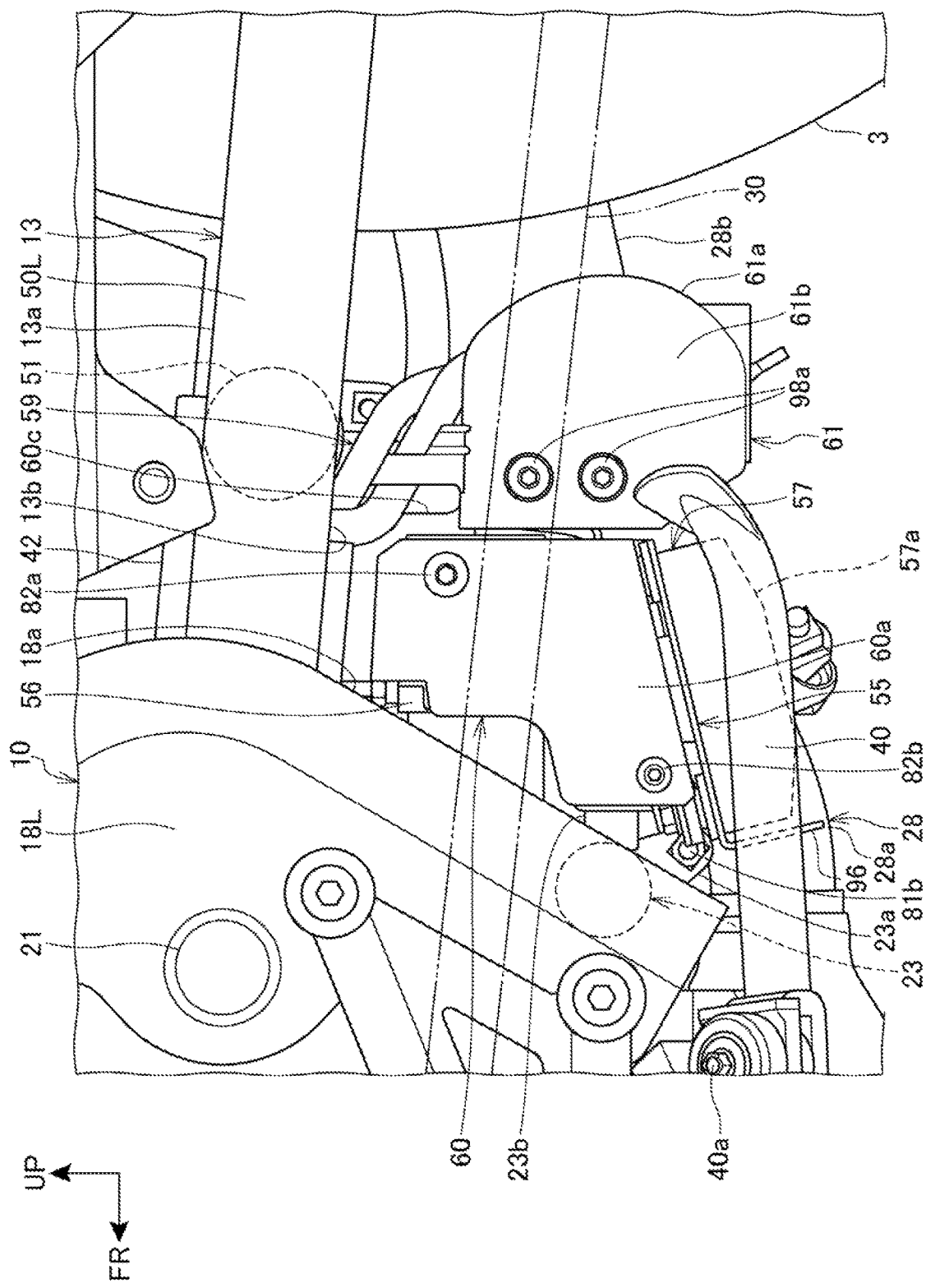
FIG. 2 is a left side elevation view of a pivot frame and a swing arm, and components disposed therearound.
Figure 3:
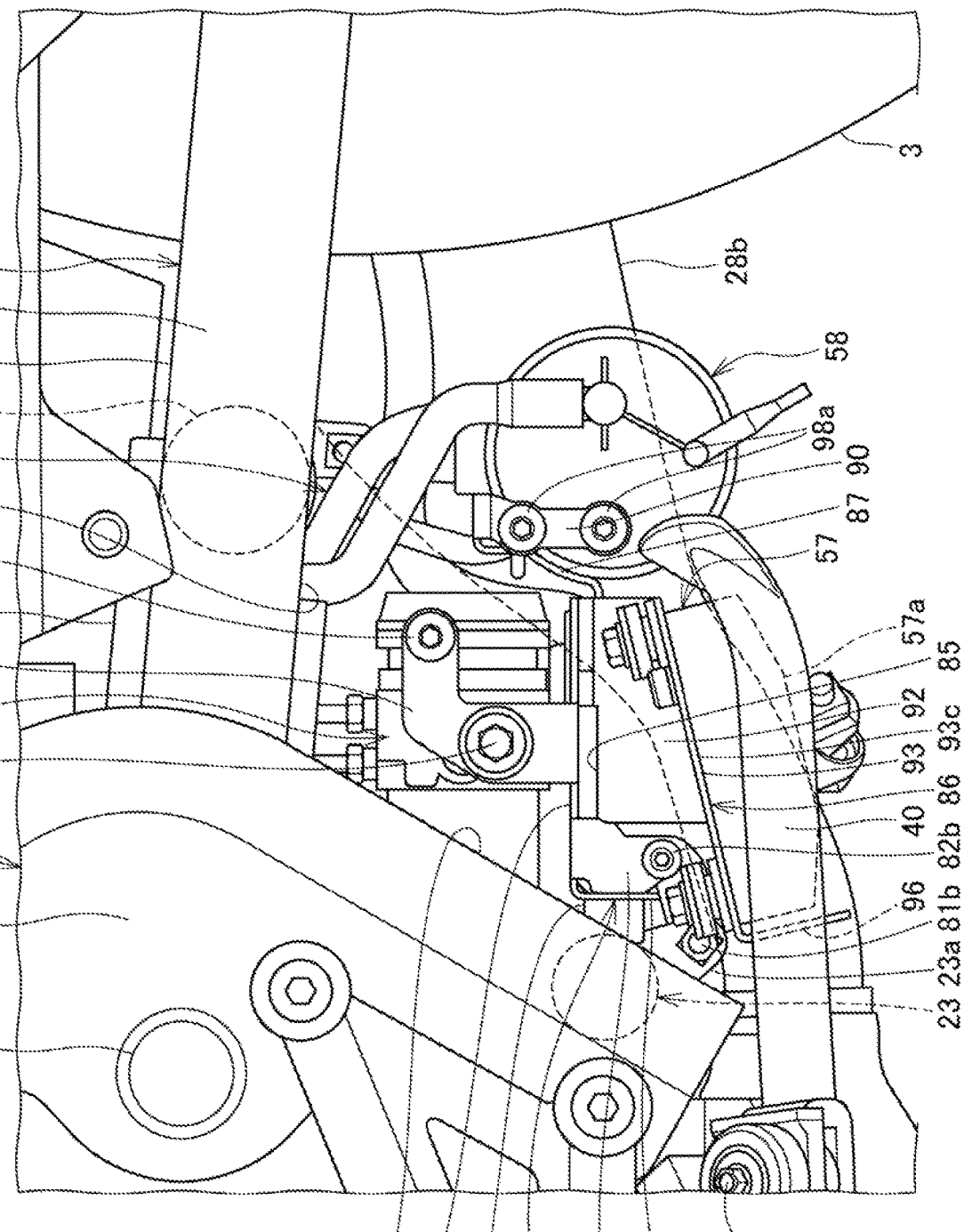
FIG. 3 is a left side elevation view of the pivot frame and the swing arm, and components disposed therearound.
Figure 4:
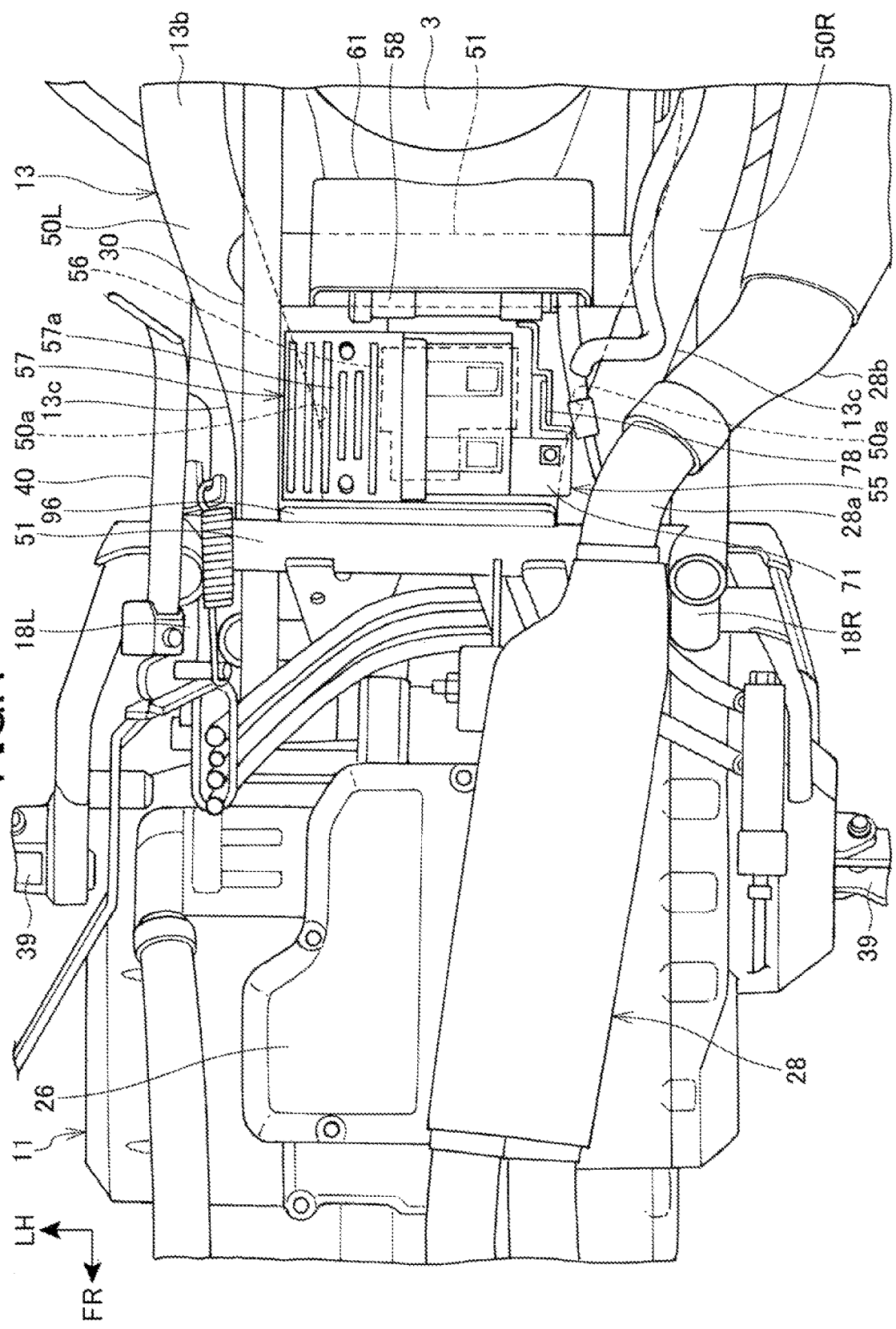
FIG. 4 is a plan view of an engine and the swing arm, and components disposed therearound, as viewed from below.

FIG. 2 is a left side elevation view of the pivot frame 18L and the swing arm 13, and components disposed therearound. FIG. 3 is a left side elevation view of the pivot frame 18L and the swing arm 13, and components disposed therearound, in which a cover 60 and a canister cover 61 to be described later are removed. FIG. 4 is a plan view of the engine 11 and the swing arm 13, and components disposed therearound, as viewed from below.

Reference is made to FIGS. 1 to 4. The swing arm 13 includes a pair of left and right arm portions 50L and 50R and a cross member 51. The arm portions 50L and 50R extend in the vehicle fore-aft direction. The cross member 51 connects the arm portions 50L and 50R in the vehicle width direction (left-right direction).

The arm portions 50L and 50R have front end portions disposed inside the pivot frames 18L and 18R in the vehicle width direction. The swing arm 13 has front end portions of the arm portions 50L and 50R supported by the pivot shaft 21.

The rear wheel 3 is supported by the axle 3a, which extends across rear end portions of the arm portions 50L and 50R. The rear wheel 3 is disposed between the arm portions 50L and 50R.

The cross member 51 is disposed between the pivot shaft 21 and the rear wheel 3 in the vehicle fore-aft direction.

The drive chain 30 (FIG. 1) extends along paths superior to, and inferior to, the arm portion 50L on the left-hand side in the vehicle fore-aft direction. A slider member 42, which protects the arm portion 50L on the left-hand side from the drive chain 30, is disposed on each of an upper surface and a lower surface at the front portion of the arm portion 50L on the left-hand side.

The vehicle body frame 10 includes a cross frame 23. The cross frame 23 connects lower end portions of the left and right pivot frames 18L and 18R in the vehicle width direction.

The cross frame 23 is disposed inferior to, and posterior to, the pivot shaft 21.

The cross frame 23 includes a central mounting portion 23a and a pair of left and right lateral mounting portions 23b. The central mounting portion 23a extends downwardly toward the rear from an intermediate portion in the vehicle width direction of the cross frame 23. The lateral mounting portions 23b extend posteriorly from the cross frame 23. The lateral mounting portions 23b are disposed opposite to each other on both lateral sides of the central mounting portion 23a.

Reference is made to FIGS. 2 to 4. A stay 55, a hydraulic control unit 56 of a braking device, a regulator 57 for an electric system, and a canister 58, which adsorbs fuel vapors, are disposed between the pivot shaft 21 and the rear wheel 3 in the vehicle fore-aft direction and inferior to the swing arm 13.

The stay 55 supports the hydraulic control unit 56, the regulator 57, and the canister 58.

Additionally, the cover 60, which covers the hydraulic control unit 56, and the canister cover 61, which covers the canister 58, are disposed between the pivot shaft 21 and the rear wheel 3 in the vehicle fore-aft direction and inferior to the swing arm 13.

The braking device of the motorcycle 1 includes a front-wheel brake (not illustrated), a rear-wheel brake, the hydraulic control unit 56, and a master cylinder (not illustrated). The front-wheel brake brakes the front wheel 2. The rear-wheel brake brakes the rear wheel 3. The hydraulic control unit 56 controls hydraulic pressures of the front-wheel brake and the rear-wheel brake. The master cylinder generates a hydraulic pressure through an operation by occupant operation of an operating lever or the like.

The hydraulic control unit 56 is an anti-lock brake system (ABS) module that controls the hydraulic pressures so as to prevent the front wheel 2 and the rear wheel 3 from locking up during a braking operation. The hydraulic control unit 56 is formed into a box shape integrating a motor, a hydraulic circuit, and the like operating so as to regulate the hydraulic pressure.

The regulator 57 is connected with a battery (not illustrated) and a generator for the engine 11. The regulator 57 rectifies a current generated by the engine 11 and supplies the resultant current to the battery. The regulator 57 is plate-shaped.

The canister 58 recovers fuel vapors from the fuel tank 32 and supplies the recovered fuel vapors to the intake device (not illustrated) of the engine 11 for combustion in the engine 11.

The canister 58 is a hollow cylindrical case. An adsorbent such as activated carbon is housed inside the canister 58.

Piping 59 is connected with the canister 58. The piping 59 includes a pipe that connects the canister 58 with the fuel tank 32, a pipe that connects the canister 58 with the intake device, and a pipe that provides communication between the canister 58 and outside air.

Figure 5:
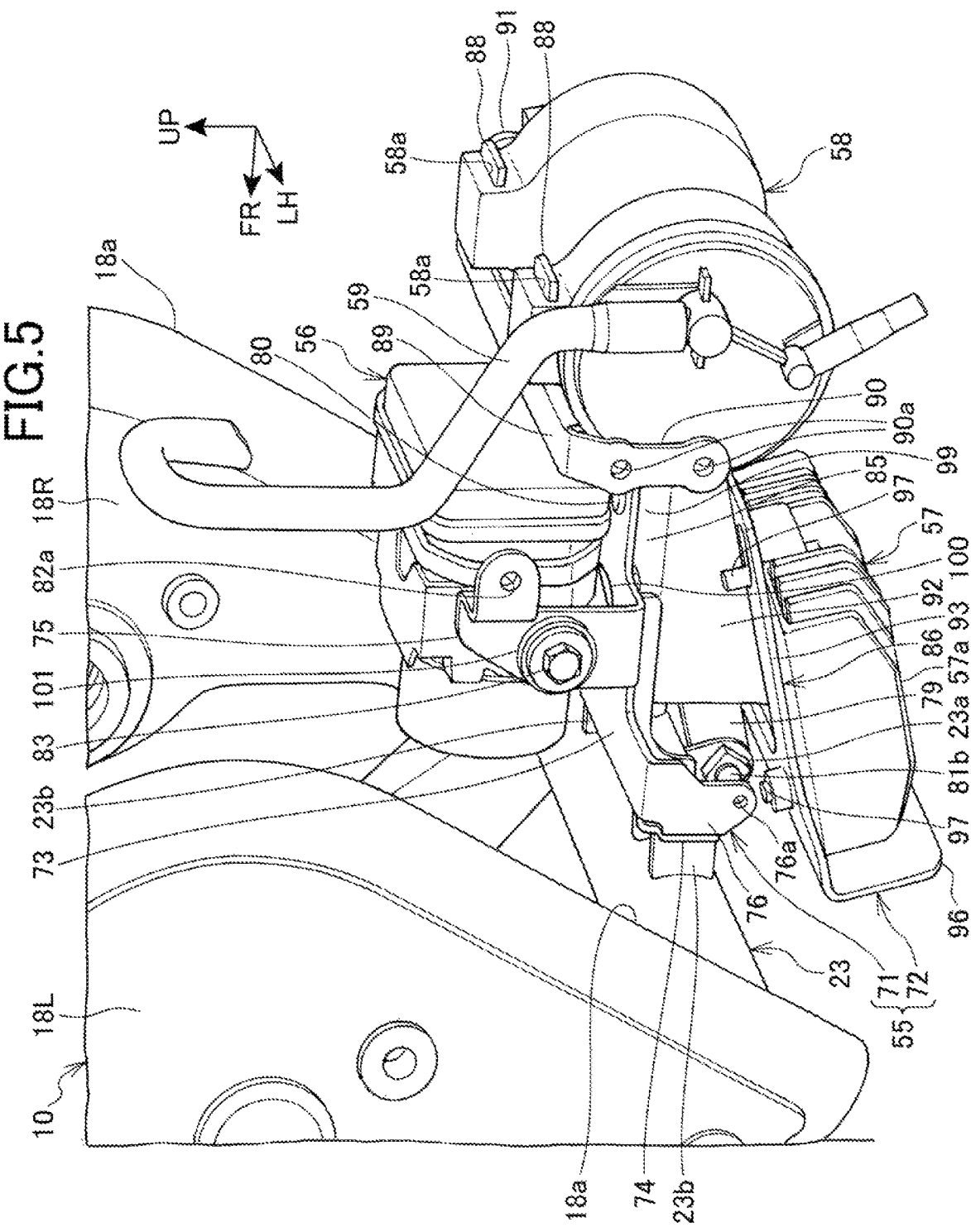
FIG. 5 is a perspective view of a structure surrounding a stay and components supported by the stay.
Figure 6:
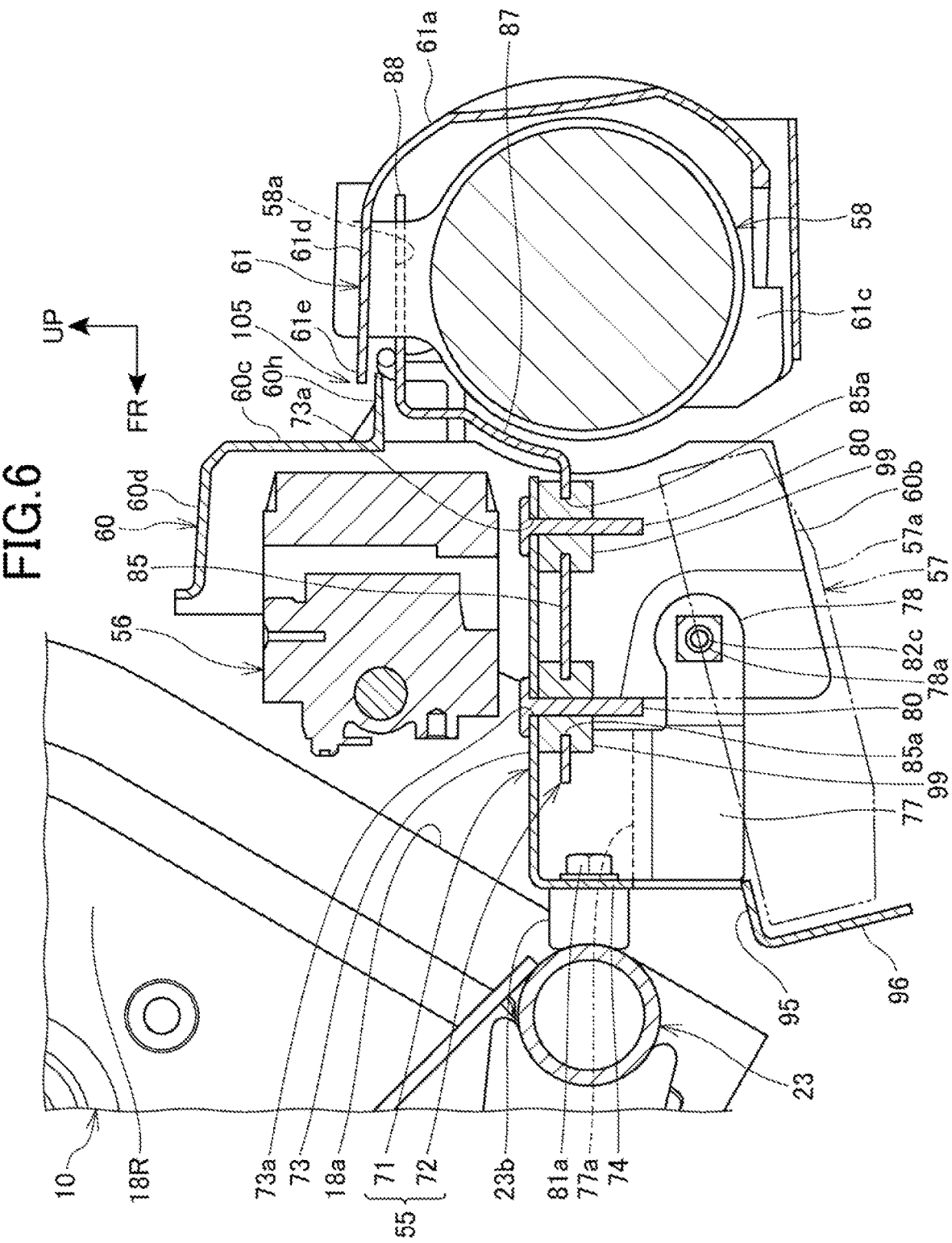
FIG. 6 is a cross-sectional view of the stay and the components supported by the stay.

FIG. 5 is a perspective view of a structure surrounding the stay 55 and components supported by the stay 55. FIG. 6 is a cross-sectional view of the stay 55 and the components supported by the stay 55. It is noted FIG. 5 depicts a condition in which the cover 60 and the canister cover 61 are removed. It is further noted that FIG. 6 represents a cross-sectional view taken along line VI-VI in FIG. 8.

The stay 55 has a front end portion mounted at a rear portion of the cross frame 23 and extends posteriorly from the cross frame 23. The stay 55 is disposed inferior to the swing arm 13 and posterior to a rear edge 18a of each of the pivot frames 18L and 18R.

The hydraulic control unit 56 is disposed on an upper portion of the stay 55. The regulator 57 is disposed on a lower portion of the stay 55. The canister 58 is disposed at a rear portion of the stay 55.

The stay 55 includes a first stay 71 and a second stay 72. The first stay 71 is fixed to the vehicle body frame 10. The second stay 72 is mounted on the first stay 71.

Figure 7:
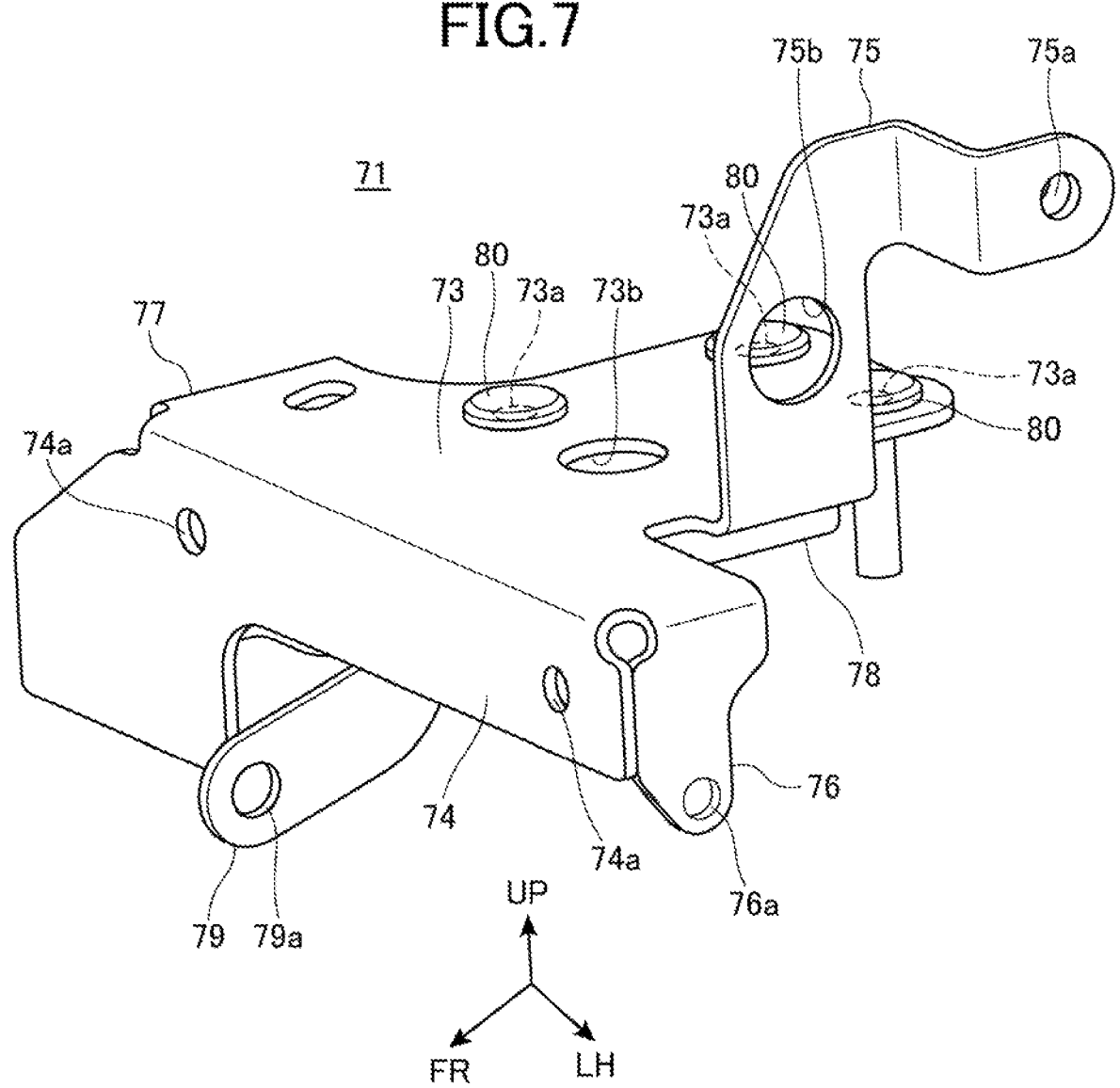
FIG. 7 is a perspective view of a first stay.
Figure 8:
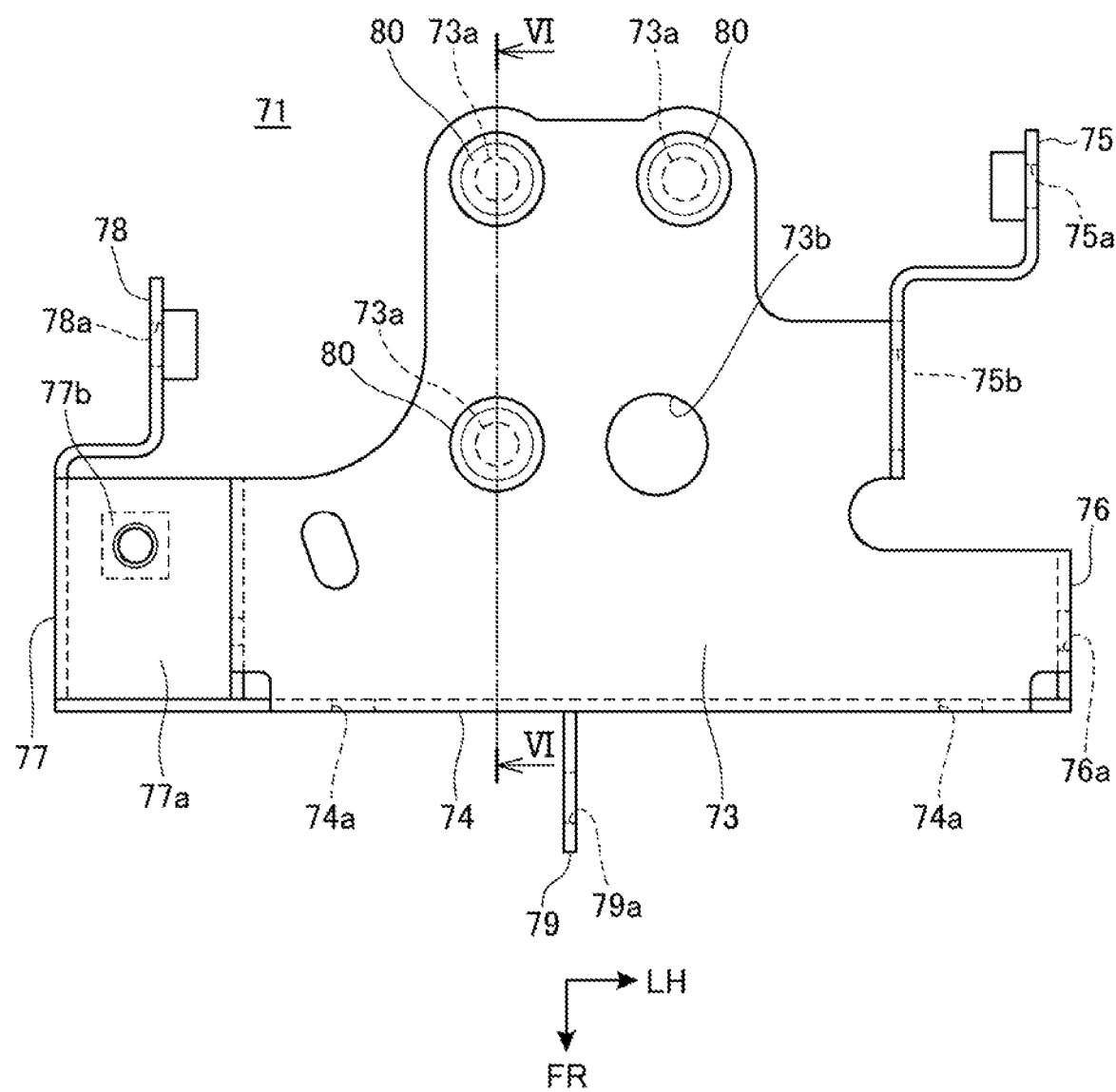
FIG. 8 is a plan view of the first stay as viewed from above.

FIG. 7 is a perspective view of the first stay 71. FIG. 8 is a plan view of the first stay 71 as viewed from above.

Reference is made to FIGS. 5 to 8. The first stay 71 includes a support plate portion 73, a front wall portion 74, an upward extended portion 75, a downward extended portion 76, and a side wall portion 77. The support plate portion 73 extends in the fore-aft direction. The front wall portion 74 extends inferiorly from a front edge of the support plate portion 73. The upward extended portion 75 extends superiorly from a first lateral side edge of the support plate portion 73. The downward extended portion 76 extends inferiorly from a position anterior to the upward extended portion 75 on the first lateral side edge of the support plate portion 73. The side wall portion 77 extends inferiorly from a second lateral side edge of the support plate portion 73.

The side wall portion 77 includes a shouldered portion 77a. The shouldered portion 77a has an upper surface portion recessed inferiorly relative to the support plate portion 73. The first stay 71 further includes a rearward extended portion 78. The rearward extended portion 78 extends posteriorly from a lower portion of the side wall portion 77.

The first stay 71 further includes a forward extended portion 79. The forward extended portion 79 extends from a lower surface of the support plate portion 73 along a path inferior to the front wall portion 74 downwardly toward the front.

The support plate portion 73 is disposed to extend substantially horizontally. The support plate portion 73 has a plurality of fixing holes 73a. A fixing bracket 80 is inserted in from above and passed through each of the fixing holes 73a. The fixing brackets 80 fasten the first stay 71 to the second stay 72.

The support plate portion 73 further has a hydraulic control unit fixing hole 73b. A fixing bracket (not illustrated) for fastening the hydraulic control unit 56 to the support plate portion 73 is passed through the hydraulic control unit fixing hole 73b.

The front wall portion 74 has a pair of frame fixing holes 74a. The frame fixing holes 74a are formed at lateral positions across the forward extended portion 79. A fixing bracket 81a (FIG. 6) is inserted in from the rear and passed through each of the frame fixing holes 74a. The fixing brackets 81a fasten the front wall portion 74 to the lateral mounting portions 23b of the cross frame 23.

The forward extended portion 79 has a frame fixing hole 79a formed in a front end portion thereof. A fixing bracket 81b (FIG. 3) is inserted in from a side and passed through the frame fixing hole 79a. The fixing bracket 81b fastens the forward extended portion 79 to the central mounting portion 23a of the cross frame 23.

The upward extended portion 75 has a cover fixing hole 75a formed in an upper end portion thereof. A cover fixing bracket 82a (FIG. 3) is inserted in from the outside in the vehicle width direction and passed through the cover fixing hole 75a. The cover fixing bracket 82a fastens the cover 60 to the upward extended portion 75.

The upward extended portion 75 has a hydraulic control unit fixing hole 75b at a position inferior to the cover fixing hole 75a. A fixing bracket 83 (FIG. 3) is inserted in from the outside in the vehicle width direction and passed through the hydraulic control unit fixing hole 75b. The fixing bracket 83 fastens the hydraulic control unit 56 to the upward extended portion 75.

The downward extended portion 76 has a cover fixing hole 76a. A cover fixing bracket 82b (FIG. 3) is inserted in from the outside in the vehicle width direction and passed through the cover fixing hole 76a. The cover fixing bracket 82b fastens the cover 60 to the downward extended portion 76.

A piping fixing portion 77b (FIG. 8) is disposed in the shouldered portion 77a of the side wall portion 77. Piping for hydraulic transmission (not illustrated) of the braking device is fixed in the piping fixing portion 77b.

The rearward extended portion 78 has a cover fixing hole 78a. A cover fixing bracket 82c (FIG. 6) is inserted in from the outside in the vehicle width direction and passed through the cover fixing hole 78a. The cover fixing bracket 82c fastens the cover 60 to the rearward extended portion 78.

Figure 9:
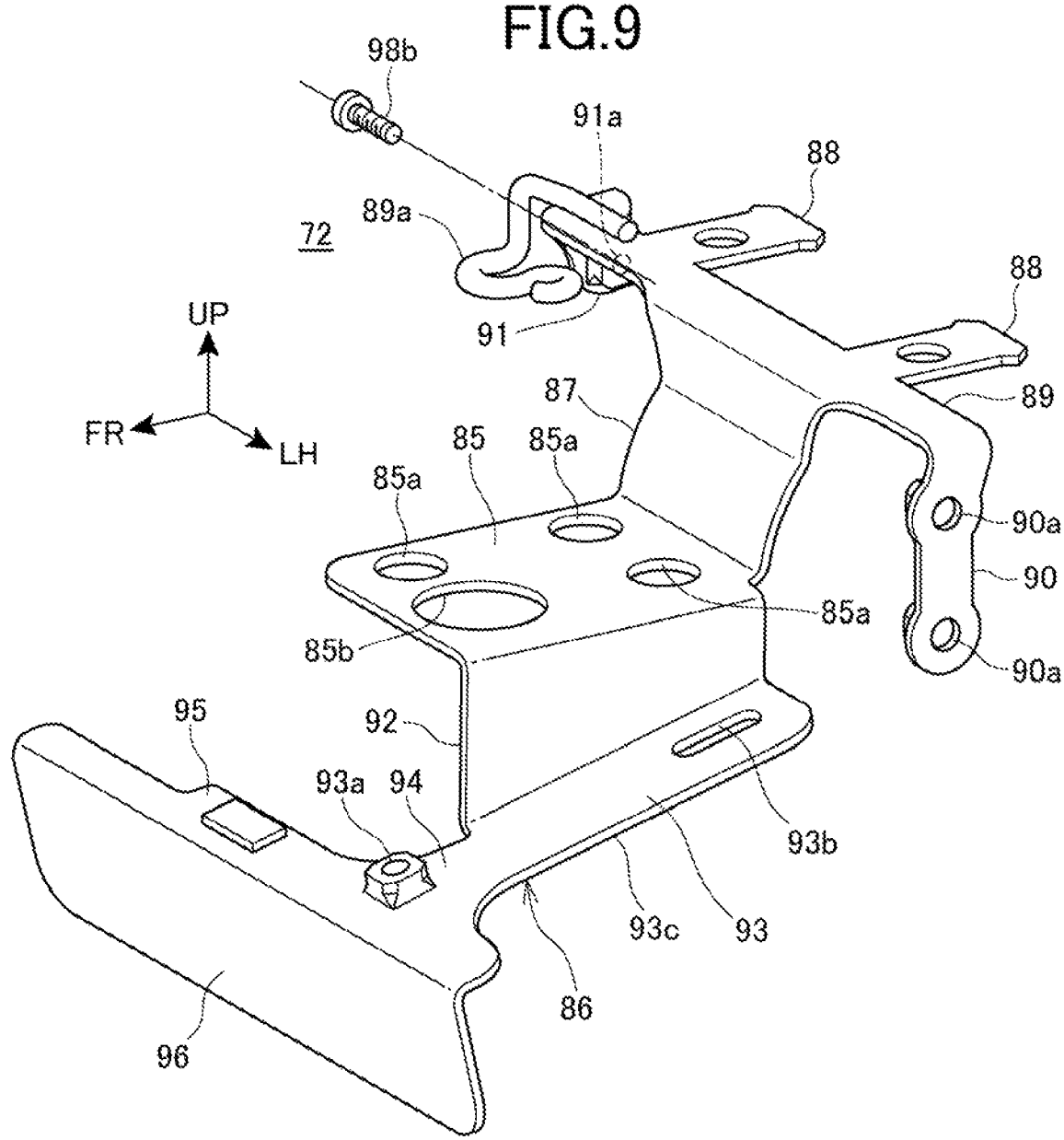
FIG. 9 is a perspective view of a second stay.

FIG. 9 is a perspective view of the second stay 72.

Reference is made to FIGS. 3, 5, 6, and 9. The second stay 72 includes a fixing plate portion 85, a regulator support portion 86, a rear wall portion 87, a pair of left and right canister support portions 88, lateral extended portions 89, and a pair of left and right canister cover support portions 90 and 91. The fixing plate portion 85 extends in the fore-aft direction. The regulator support portion 86 is disposed inferior to the fixing plate portion 85. The rear wall portion 87 extends superiorly from a rear edge of the fixing plate portion 85. The canister support portions 88 extend posteriorly from an upper end of the rear wall portion 87. The lateral extended portions 89 extend from upper ends of the rear wall portion 87 laterally. The canister cover support portions 90 and 91 extend inferiorly from respective outer ends of the lateral extended portions 89.

The fixing plate portion 85 is disposed to extend substantially horizontally and substantially in parallel with the support plate portion 73 of the first stay 71.

The fixing plate portion 85 has a plurality of fixing holes 85a, through which the fixing brackets 80 are passed. The fixing plate portion 85 further has a clearance hole 85b.

The regulator support portion 86 includes a side wall portion 92, a lower wall portion 93, a forward extended portion 94, a vehicle-width-direction extended portion 95, and a protective wall portion 96. The side wall portion 92 extends inferiorly from a first lateral side edge of the fixing plate portion 85. The lower wall portion 93 extends from a lower edge of the side wall portion 92 to the outside in the vehicle width direction. The forward extended portion 94 extends anteriorly from a front end of the lower wall portion 93. The vehicle-width-direction extended portion 95 extends from a front end of the forward extended portion 94 in the vehicle width direction. The protective wall portion 96 extends inferiorly from a front edge of the vehicle-width-direction extended portion 95.

The lower wall portion 93 of the regulator support portion 86 is a plate-shaped portion inclined upwardly toward the rear in a vehicle side view. The lower wall portion 93 has regulator fixing holes 93a and 93b at a front end portion and a rear end portion, respectively, thereof. A fixing bracket 97 (FIG. 5) is passed through each of the regulator fixing holes 93a and 93b. The fixing brackets 97 fasten the regulator 57 to the lower wall portion 93.

The vehicle-width-direction extended portion 95 of the regulator support portion 86 extends in the vehicle width direction toward a second lateral side edge of the fixing plate portion 85.

The canister cover support portion 90 on the left-hand side has a plurality of canister cover fixing holes 90a. A fixing bracket 98a (FIG. 3) is inserted in from the outside in the vehicle width direction and passed through each of the canister cover fixing holes 90a. The fixing brackets 98a fasten the canister cover 61 to the canister cover support portion 90.

The canister cover support portion 91 on the right-hand side has a canister cover fixing hole 91a. A fixing bracket 98b (FIG. 9) is inserted in from the outside in the vehicle width direction and passed through the canister cover fixing hole 91a. The fixing bracket 98b fastens the canister cover 61 to the canister cover support portion 91.

A piping support portion 89a is provided for the lateral extended portions 89 at the upper portion of the second stay 72. The piping support portion 89a supports, in the piping 59 (FIG. 2), the pipe that connects the canister 58 with the fuel tank 32.

As illustrated in FIG. 6, a cylindrical vibration-proof member 99 is fitted in each of the fixing holes 85a in the fixing plate portion 85 of the second stay 72. The vibration-proof member 99 has an annular groove in an outer peripheral portion thereof fitted in an inner periphery of the fixing hole 85a. The vibration-proof member 99 is formed of rubber.

The fixing plate portion 85 of the second stay 72 is placed over the support plate portion 73 of the first stay 71 from below and the second stay 72 is fastened to the first stay 71 by the fixing brackets 80.

The fixing brackets 80, which fasten the first stay 71 to the second stay 72, fit in inner peripheral portions of the vibration-proof members 99. The fixing plate portion 85 has an upper surface abutting on a lower surface of the support plate portion 73 via the vibration-proof members 99. Specifically, the second stay 72 is rubber-mounted on the first stay 71 via the vibration-proof members 99.

Reference is made to FIGS. 3, 5, and 6 to 8. The hydraulic control unit 56 is fixed to an upper surface of the support plate portion 73 of the first stay 71.

More specifically, the hydraulic control unit 56 is fastened to the support plate portion 73 via a cylindrical vibration-proof member 100 (FIG. 5), which is fitted in the hydraulic control unit fixing hole 73b in the support plate portion 73, by a fixing bracket (not illustrated) that is passed through the vibration-proof member 100.

In addition, the hydraulic control unit 56 is fastened to the upward extended portion 75 via a cylindrical vibration-proof member 101 (FIG. 5), which is fitted in the hydraulic control unit fixing hole 75b in the upward extended portion 75, by the fixing bracket 83, which is passed through the vibration-proof member 101.

Specifically, the hydraulic control unit 56 is rubber-mounted on the upper portion of the first stay 71 via the vibration-proof member 100 and the vibration-proof member 101.

The vibration-proof member 100 and the fixing bracket passed through the vibration-proof member 100 clear the second stay 72 via the clearance hole 85b.

The regulator 57 is fixed to the regulator support portion 86 of the second stay 72. The regulator support portion 86 constitutes a lower portion of the stay 55. The regulator 57 is disposed to extend along the lower wall portion 93 of the regulator support portion 86. The regulator 57 is disposed in such an orientation that a thickness direction of the regulator 57 is oriented in the vertical direction of the vehicle.

More specifically, the regulator 57 is fixed to the lower wall portion 93 by the fixing brackets 97 under a condition in which the upper surface of the regulator 57 abuts on a lower surface 93c of the lower wall portion 93 of the regulator support portion 86. The lower surface 93c constitutes a lower surface of the stay 55.

Because the lower surface 93c of the lower wall portion 93 is inclined upwardly toward the rear in a vehicle side view, the regulator 57 takes a posture inclined upwardly toward the rear in the vehicle side view and a lower surface 57a of the regulator 57 is inclined upwardly toward the rear.

The regulator 57 thus can obtain a height from a road surface, so that mud and the like on the road surface side can be prevented from sticking to the regulator 57.

Additionally, the front surface of the regulator 57 is covered from the front by the protective wall portion 96 of the stay 55. Thus, the regulator 57 can be protected by the protective wall portion 96 from, for example, splashing mud.

Reference is made to FIGS. 5, 6, and 9. The canister 58 is disposed such that a central axis of the cylindrical canister 58 is oriented in the vehicle width direction.

The canister 58 has a pair of mounting hole portions 58a at an upper end portion thereof. The mounting hole portions 58a extend to pass through the canister 58 in the fore-aft direction and are disposed side by side in the vehicle width direction.

The canister 58 is fixed to the canister support portions 88 of the second stay 72. The canister support portions 88 constitute a rear portion of the stay 55.

More specifically, the canister 58 is fixed to the second stay 72 by the mounting hole portions 58a on the left and right being inserted in the respective canister support portions 88.

In a vehicle side view, the regulator 57 is disposed inferior to the hydraulic control unit 56 and the canister 58 is disposed posterior to the hydraulic control unit 56 and, in the vertical direction, inferior to the hydraulic control unit 56 and superior to the regulator 57.

The hydraulic control unit 56 has the greatest volume and the heaviest weight among the three components of the hydraulic control unit 56, the canister 58, and the regulator 57, which are supported by the stay 55.

The canister 58 is the lightest among the hydraulic control unit 56, the canister 58, and the regulator 57.

The regulator 57 has the smallest vertical size (thickness) among the hydraulic control unit 56, the canister 58, and the regulator 57.

The hydraulic control unit 56 is disposed at a position close to the front end portion of the stay 55, which is fixed to the cross frame 23. Thus, the hydraulic control unit 56, which is heavy in weight, can be rigidly supported by the stay 55. Additionally, the canister 58, which is light in weight, is supported by the stay 55 at a position posterior to the hydraulic control unit 56. A load acting on the stay 55 can thus be minimized.

Additionally, because the regulator 57, which has a small thickness, is disposed at the lower portion of the stay 55, a greater distance can be achieved between the component supported by the stay 55 and the road surface.

The regulator 57 and the canister 58 are supported by the second stay 72, which is rubber-mounted on the first stay 71 via the vibration-proof members 99. Specifically, the regulator 57 and the canister 58 are rubber-mounted on the first stay 71 via the second stay 72. Thus, the vibration-proof members can be shared between the regulator 57 and the canister 58 and the regulator 57 and the canister 58 can be rubber-mounted through a simple structure. This configuration helps reduce vibrations transmitted to the regulator 57 and the canister 58.

Additionally, the regulator 57, being rubber-mounted via the vibration-proof members 99, allows the regulator 57 of an ordinary type having no special vibration-proof structure to be used, so that the cost of the regulator 57 can be reduced.

Figure 10:
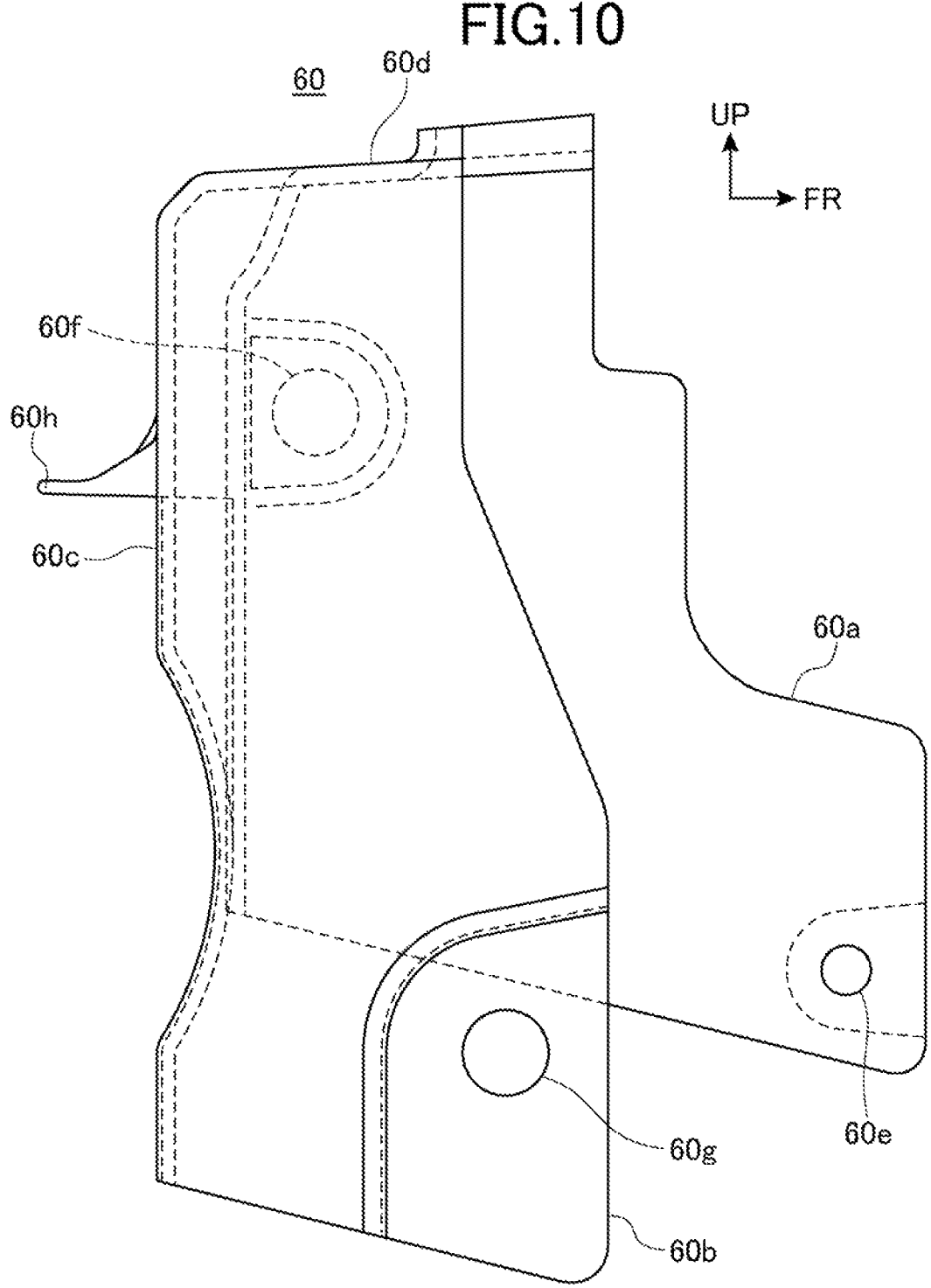
FIG. 10 is a right side elevation view of a cover.
Figure 11:
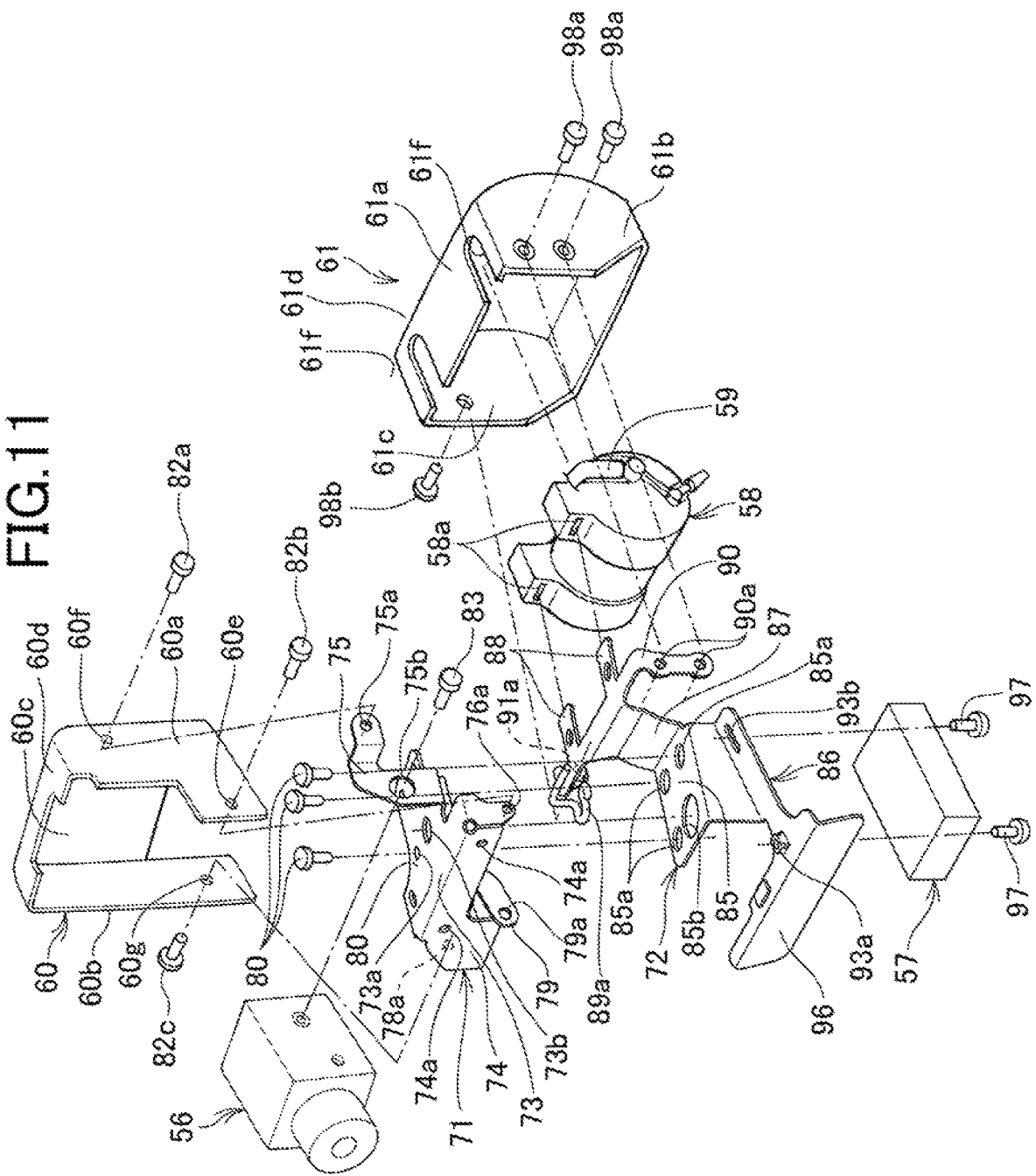
FIG. 11 is an exploded perspective view of the stay, a hydraulic control unit, a regulator, a canister, a cover, and a canister cover.

FIG. 10 is a right side elevation view of the cover 60 for the hydraulic control unit 56. FIG. 11 is an exploded perspective view of the stay 55, the hydraulic control unit 56, the regulator 57, the canister 58, the cover 60, and the canister cover 61.

Reference is made to FIGS. 2, 6 to 8, 10, and 11. The cover 60 is mounted on the first stay 71 and covers the hydraulic control unit 56.

The cover 60 includes a pair of side wall portions 60a and 60b, a rear wall portion 60c, and an upper wall portion 60d. The side wall portions 60a and 60b laterally cover left and right side surfaces of the hydraulic control unit 56. The rear wall portion 60c connects upper portions of rear edge portions of the side wall portions 60a and 60b in the vehicle width direction. The upper wall portion 60d connect upper edge portions of the side wall portions 60a and 60b. The cover 60 opens anteriorly and inferiorly.

The left side wall portion 60a has fixing holes 60e and 60f. The side wall portion 60a is fixed to the cover fixing hole 76a (FIG. 7) in the first stay 71 by the cover fixing bracket 82b (FIG. 2), which is passed through the fixing hole 60e. The side wall portion 60a is also fixed to the cover fixing hole 75a (FIG. 7) in the first stay 71 by the cover fixing bracket 82a (FIG. 2), which is passed through the fixing hole 60f.

The right side wall portion 60b has a fixing hole 60g. The side wall portion 60b is fixed to the cover fixing hole 78a (FIG. 8) in the first stay 71 by the cover fixing bracket 82c (FIG. 6), which is passed through the fixing hole 60g.

The rear wall portion 60c of the cover 60 covers the upper portion of the hydraulic control unit 56 from the rear. The lower portion of the hydraulic control unit 56 is covered by the rear wall portion 87 of the second stay 72 from the rear.

The upper wall portion 60d of the cover 60 covers the hydraulic control unit 56 from above.

The left side wall portion 60a (FIG. 2) of the cover 60 laterally covers the hydraulic control unit 56 and the side wall portion 92 of the second stay 72.

The right side wall portion 60b (FIG. 6) of the cover 60 extends further inferiorly relative to the side wall portion 60a to thereby laterally cover the hydraulic control unit 56 and the regulator 57.

The cover 60 includes an extended portion 60h. The extended portion 60h extends posteriorly from the rear wall portion 87 toward the side of the canister 58. The extended portion 60h represents a plate-shaped portion disposed to extend substantially horizontally.

Reference is made to FIGS. 2 and 6. The canister cover 61 is mounted on the second stay 72 and covers the canister 58.

The canister cover 61 includes a tubular peripheral wall portion 61a and a pair of left and right side wall portions 61b and 61c. The peripheral wall portion 61a covers an outer periphery of the cylindrical canister 58. The side wall portions 61b and 61c close both ends of the peripheral wall portion 61a.

The peripheral wall portion 61a of the canister cover 61 covers the canister 58 from above, rear, and below. The peripheral wall portion 61a has a front surface generally opening anteriorly.

The side wall portions 61b and 61c of the canister cover 61 cover the canister 58 from left and right lateral sides.

The canister cover 61 is fixed to the canister cover fixing holes 90a (FIG. 3) in the second stay 72 by the fixing brackets 98a (FIG. 2), which are passed through the left side wall portion 61b.

The canister cover 61 is also fixed to the canister cover fixing hole 91a in the second stay 72 by the fixing bracket 98b (FIG. 9), which is passed through the right side wall portion 61c.

Reference is made to FIG. 6. An upper surface portion 61d of the peripheral wall portion 61a of the canister cover 61 has a front edge portion 61e overlapping from above the extended portion 60h of the cover 60.

The front edge portion 61e and the extended portion 60h, overlapping each other in the vertical direction of the vehicle and being spaced apart from each other in the vertical direction, form a labyrinth portion 105. The labyrinth portion 105 is disposed superior to an upper surface of the rear portion of the second stay 72 and located superior to the front portion of the canister 58.

In the labyrinth portion 105, because of a small gap available between the front edge portion 61e and the extended portion 60h, water or dust and dirt can be prevented from entering sides of the second stay 72 and the canister 58 from a space between the canister cover 61 and the cover 60.

The canister cover 61 is disposed posterior to the regulator 57 and the canister cover 61 has a lower portion overlapping the regulator 57 from the rear. The foregoing configuration allows the canister cover 61 to be used for protecting the regulator 57 from the rear.

The upper surface portion 61d of the canister cover 61 has a plurality of piping recessed portions 61f, through which the piping 59 of the canister 58 is passed vertically.

Reference is made to FIGS. 2 and 3. The stay 55, the hydraulic control unit 56, the regulator 57, the canister 58, the cover 60, and the canister cover 61 are disposed, in a vehicle side view, posterior to the pivot shaft 21 and inferior to an upper surface 13a (upper end) of the swing arm 13 in an area anterior to the rear wheel 3. The upper surface 13a constitutes upper surfaces of the arm portions 50L and 50R.

Through the foregoing configuration, the stay 55, the hydraulic control unit 56, the regulator 57, the canister 58, the cover 60, and the canister cover 61 can be efficiently disposed through the use of a space posterior to the pivot shaft 21, anterior to the rear wheel 3, and inferior to the upper surface 13a of the swing arm 13.

More specifically, the stay 55, the regulator 57, and the canister 58 are disposed, in a vehicle side view, posterior to the rear edge 18a of each of the pivot frames 18L and 18R and inferior to a lower surface 13b (lower end) of the swing arm 13. The lower surface 13b constitutes the lower surface of the arm portions 50L and 50R.

Through the foregoing configuration, the stay 55, the regulator 57, the canister 58, the cover 60, and the canister cover 61 can be efficiently disposed through the use of a space posterior to rear edge 18a of each of the pivot frames 18L and 18R and inferior to the lower surface 13b of the swing arm 13.

The hydraulic control unit 56, while being disposed posterior to the pivot shaft 21 and inferior to the lower surface 13b of the swing arm 13, has the front end portion overlapping the rear portions of the pivot frames 18L and 18R.

The hydraulic control unit 56 and the regulator 57 are disposed anterior to the cross member 51 of the swing arm 13. The cross member 51 overlaps the canister 58 from above.

Reference is made to FIGS. 2 and 3. The side stand 40 under a stowed condition overlaps the regulator 57 from the lateral outside in a vehicle side view. Specifically, the regulator 57 is covered and protected by the side stand 40 laterally.

The exhaust pipe 28a of the exhaust device 28 has a rear end portion disposed on the opposite side of the regulator 57 from the side stand 40 in the vehicle width direction and overlapping the regulator 57 from the lateral outside. Specifically, the regulator 57 is laterally covered and protected by the exhaust pipe 28a.

Reference is made to FIG. 4. In a plan view, the regulator 57 is disposed inside in the vehicle width direction outer side surfaces 13c of the swing arm 13 on the left and right sides. The outer side surfaces 13c of the swing arm 13 constitute outer side surfaces of the arm portions 50L and 50R.

Additionally, the hydraulic control unit 56 is disposed, in a plan view, inside in the vehicle width direction inner side surfaces 50a of the left and right arm portions 50L and 50R and anterior to the cross member 51.

Thus, when the swing arm 13 swings inferiorly, the hydraulic control unit 56 can be located in a space between the arm portions 50L and 50R and anterior to the cross member 51.

Reference is made to FIGS. 2 and 4. The drive chain 30 overlaps the stay 55, the hydraulic control unit 56, the canister 58, the cover 60, and the canister cover 61 from the outside in the vehicle width direction.

Specifically, the stay 55, the hydraulic control unit 56, the canister 58, the cover 60, and the canister cover 61 are disposed inside in the vehicle width direction relative to the drive chain 30. The foregoing configuration enables a space inside the drive chain 30 in the vehicle width direction to be effectively used.

As described above, in accordance with the embodiment to which the present invention is applied, the motorcycle 1 includes the vehicle body frame 10, the swing arm 13, which supports the rear wheel 3, the pivot shaft 21, which swingably supports the swing arm 13 on the vehicle body frame 10, and the regulator 57 for an electric system. The regulator 57 is supported by the stay 55. The regulator 57 is disposed, in a vehicle side view, posterior to the pivot shaft 21 and inferior to the upper surface 13a of the swing arm 13.

Through the foregoing configuration, the regulator 57 for the electric system can be efficiently disposed, in the motorcycle 1 having a limited space for mounting components, using a space posterior to the pivot shaft 21 and inferior to the upper surface 13a of the swing arm 13.

The hydraulic control unit 56 for the braking devices for the front wheel 2 and the rear wheel 3 is mounted on the stay 55 and disposed posterior to the pivot shaft 21 and inferior to the upper surface 13a of the swing arm 13.

Through the foregoing configuration, the hydraulic control unit 56 can be efficiently disposed via the stay 55 using a space posterior to the pivot shaft 21 and inferior to the upper surface 13a of the swing arm 13.

The canister 58, which adsorbs fuel vapors, is mounted on the stay 55 and disposed posterior to the pivot shaft 21 and inferior to the upper surface 13a of the swing arm 13.

Through the foregoing configuration, the canister 58 can be efficiently disposed via the stay 55 using a space posterior to the pivot shaft 21 and inferior to the upper surface 13a of the swing arm 13.

The vehicle body frame 10 includes the pivot frames 18L and 18R, which support the pivot shaft 21, the stay 55 is mounted on the vehicle body frame 10 at a position inferior to the upper surface 13a of the swing arm 13 and extends further posteriorly relative to the pivot frames 18L and 18R, the regulator 57 is disposed at the lower portion of the stay 55, the hydraulic control unit 56 is disposed at the upper portion of the stay 55, and the canister 58 is disposed at the rear portion of the stay 55.

Through the foregoing configuration, the regulator 57, the hydraulic control unit 56, and the canister 58 can be supported by a simple structure at a position inferior to the upper surface 13a of the swing arm 13 using the stay 55, which is disposed inferior to the upper surface 13a of the swing arm 13 and extends further posteriorly relative to the pivot frames 18L and 18R. The regulator 57, the hydraulic control unit 56, and the canister 58 can be disposed in a well-balanced manner at the lower portion of the stay 55, at the upper portion of the stay 55, and at the rear portion of the stay 55, respectively.

The vehicle body frame 10 further includes the cross frame 23, which connects a pair of the left and right pivot frames 18L and 18R in the left-right direction, and the stay 55 has the front portion mounted on the cross frame 23.

Through the foregoing configuration, the stay 55 can be rigidly supported by a simple structure using the cross frame 23, which connects the pivot frames 18L and 18R in the left-right direction.

The lower surface 93c of the stay 55 is inclined upwardly toward the rear and the regulator 57 is disposed to extend along the lower surface 93c.

Through the foregoing configuration, the regulator 57 is inclined along the lower surface 93c of the stay 55, which is inclined upwardly toward the rear, so that an effect from, for example, splashing mud from below on the regulator 57 can be reduced.

Additionally, the canister cover 61 is provided for covering the canister 58 and the regulator 57 is located anterior to the canister cover 61.

Through the foregoing configuration, the regulator 57 can be protected from the rear using the canister cover 61.

The cover 60 is provided for covering the hydraulic control unit 56. The cover 60 includes the extended portion 60h, which extends posteriorly from the rear portion of the cover 60. The canister cover 61 has the front edge portion 61e overlapping the extended portion 60h in the vertical direction.

Through the foregoing configuration, the labyrinth portion 105 can be formed by portions of the front edge portion 61e of the canister cover 61 and the extended portion 60h of the cover 60 overlapping in the vertical direction, so that rainwater or the like can be prevented from entering a space between the cover 60 and the canister cover 61.

Additionally, the motorcycle 1 includes the side stand 40, which supports the motorcycle 1 when the motorcycle 1 is parked. The side stand 40, when stowed, overlaps the regulator 57 from the outside in a vehicle side view.

Through the foregoing configuration, the regulator 57 can be protected from an outer lateral side using the side stand 40.

Additionally, the engine 11 is provided for driving the rear wheel 3. The exhaust device 28 of the engine 11 overlaps the regulator 57 from the outside in a vehicle side view.

Through the foregoing configuration, the exhaust device 28 can be used for protecting the regulator 57 from the outer lateral side.

The stay 55 includes the first stay 71, which is fixed to the vehicle body frame 10, and the second stay 72, which is rubber-mounted on the first stay 71. The regulator 57 and the canister 58 are fixed to the second stay 72.

Through the foregoing configuration, the regulator 57 and the canister 58 can be rubber-mounted through a simple structure.

The regulator 57 is disposed inferior to the lower surface 13b of the swing arm 13 in the vehicle side view.

Through the foregoing configuration, the regulator 57 can be efficiently disposed using a space inferior to the lower surface 13b of the swing arm 13.

The motorcycle 1 includes the side stand 40, which supports the motorcycle 1 when the motorcycle 1 is parked, and the engine 11, which drives the rear wheel 3. When the side stand 40 is stowed, the regulator 57 is covered by the side stand 40 and the exhaust device 28 of the engine 11 from both lateral sides.

Through the foregoing configuration, the regulator 57 can be protected by the side stand 40 and the exhaust device 28 from the lateral sides.

The stay 55 includes the protective wall portion 96, which extends inferiorly, at the front portion thereof and the canister cover 61 is provided for covering the canister 58. The regulator 57 is covered by the protective wall portion 96 from the front and by the canister cover 61 from the rear.

Through the foregoing configuration, the regulator 57 can be protected in the fore-aft direction by the protective wall portion 96 of the stay 55 and the canister cover 61.

It should be clearly understood that the embodiment of the invention described above is illustrative only and is not intended to limit the scope of the invention.

While the regulator 57 has been described to be disposed inferior to the lower surface 13b of the swing arm 13 in the above-described embodiment, the invention is not limited thereto. The regulator 57 only needs to be disposed inferior to the upper surface 13a of the swing arm 13 and, for example, the regulator 57 may be disposed between the upper surface 13a and the lower surface 13b.

While the regulator 57 has been described to be disposed, in a vehicle side view, posterior to the rear edge 18a of each of the pivot frames 18L and 18R in the above-described embodiment, the invention is not limited thereto. The regulator 57 only needs to be disposed posterior to the pivot shaft 21 and the regulator 57 may be disposed, for example, at a position posterior to the pivot shaft 21 and at which the regulator 57 overlaps the pivot frames 18L and 18R in the vehicle side view.

In addition, while the embodiment has been described as applied to the motorcycle 1, the invention is not limited thereto. The present invention may still be applied to a three-wheel saddle riding vehicle including two front wheels or two rear wheels, or even to a saddle riding vehicle including four or more wheels.

DESCRIPTION OF REFERENCE SYMBOLS

1 Motorcycle (saddle riding vehicle)
2 Front wheel (wheel)
3 Rear wheel (wheel)
10 Vehicle body frame
11 Engine (internal combustion engine)
13 Swing arm
13a Upper surface (upper end)
13b Lower surface (lower end)
18L, 18R Pivot frame
21 Pivot shaft
23 Cross frame
28 Exhaust device
40 Side stand
55 Stay
56 Hydraulic control unit
57 Regulator
58 Canister
60 Cover
60h Extended portion
61 Canister cover
61e Front edge portion
71 First stay
72 Second stay
93c Lower surface (lower surface of the stay)
96 Protective wall portion

The invention claimed is:

1. A saddle riding vehicle comprising:
a vehicle body frame;
a swing arm that supports a rear wheel;
a pivot shaft that swingably supports the swing arm on the vehicle body frame; and
a regulator for an electric system, wherein
the regulator is supported by a stay,
the regulator is disposed, in a vehicle side view, posterior to the pivot shaft and inferior to an upper end of the swing arm,
a hydraulic control unit of a braking device for a wheel is mounted on the stay, and
the hydraulic control unit is disposed posterior to the pivot shaft and inferior to the upper end of the swing arm.

2. The saddle riding vehicle according to claim 1, wherein a canister that adsorbs fuel vapors is mounted on the stay, and
the canister is disposed posterior to the pivot shaft and inferior to the upper end of the swing arm.

3. The saddle riding vehicle according to claim 2, wherein the vehicle body frame includes a pivot frame that supports the pivot shaft,
the stay is mounted on the vehicle body frame at a position inferior to the upper end of the swing arm and extends further posteriorly relative to the pivot frame,
the regulator is disposed at a lower portion of the stay,
the hydraulic control unit is disposed at an upper portion of the stay, and
the canister is disposed at a rear portion of the stay.

4. The saddle riding vehicle according to claim 3, wherein the vehicle body frame includes a cross frame that connects a pair of the left and right pivot frames in a left-right direction, and
the stay has a front portion mounted on the cross frame.

5. The saddle riding vehicle according to claim 2, wherein the canister is provided with a canister cover that covers the canister, and
the regulator is located anterior to the canister cover.

6. The saddle riding vehicle according to claim 5, wherein the hydraulic control unit is provided with a cover that covers the hydraulic control unit,
the cover includes an extended portion that extends posteriorly from a rear portion of the cover, and
the canister cover has a front edge portion overlapping the extended portion in a vertical direction.

7. The saddle riding vehicle according to claim 1, comprising:
a side stand that supports the saddle riding vehicle when the saddle riding vehicle is parked, wherein
the side stand, when stowed, overlaps the regulator from an outside in the vehicle side view.

8. The saddle riding vehicle according to claim 1, comprising:
an internal combustion engine that drives the rear wheel, wherein
an exhaust device of the internal combustion engine overlaps the regulator from the outside in the vehicle side view.

9. The saddle riding vehicle according to claim 1, wherein the stay includes a first stay that is fixed to the vehicle body frame and a second stay that is rubber-mounted on the first stay, and
the regulator and the canister are fixed to the second stay.

10. The saddle riding vehicle according to claim 1, wherein
the regulator is disposed inferior to a lower end of the swing arm in the vehicle side view.

11. The saddle riding vehicle according to claim 2, wherein
the stay includes, at a front portion of the stay, a protective wall portion that extends inferiorly,
a canister cover is provided for covering the canister, and
the regulator is covered by the protective wall portion from a front and by the canister cover from a rear.

12. A saddle riding vehicle comprising:
a vehicle body frame;
a swing arm that supports a rear wheel;
a pivot shaft that swingably supports the swing arm on the vehicle body frame; and
a regulator for an electric system, wherein
the regulator is supported by a stay,
the regulator is disposed, in a vehicle side view, posterior to the pivot shaft and inferior to an upper end of the swing arm, the stay has a lower surface inclined upwardly toward a rear, and the regulator is disposed to extend along the lower surface.

13. A saddle riding vehicle comprising:
a vehicle body frame;
a swing arm that supports a rear wheel;
a pivot shaft that swingably supports the swing arm on the vehicle body frame; and
a regulator for an electric system, wherein
the regulator is supported by a stay,
the regulator is disposed, in a vehicle side view, posterior to the pivot shaft and inferior to an upper end of the swing arm,
a side stand that supports the saddle riding vehicle when the saddle riding vehicle is parked; and
an internal combustion engine that drives the rear wheel, wherein
under a condition in which the side stand is stowed, the regulator is covered by the side stand and an exhaust device of the internal combustion engine from both lateral sides.

\* \* \* \* \*